United States Patent Office 3,399,526
Patented Sept. 3, 1968

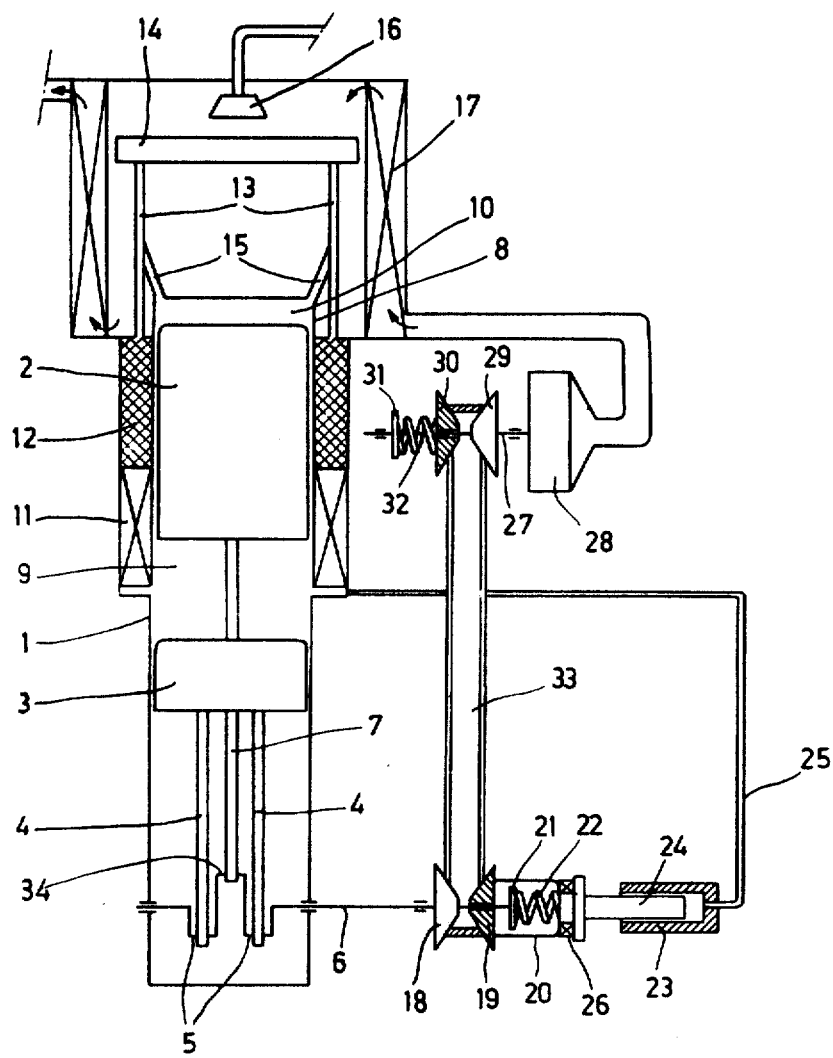

3,399,526
HOT-GAS RECIPROCATING ENGINE
Roelf Jan Meijer, Emmasingel, Netherlands, assignor to North American Philips Company, Inc., New York, N.Y., a corporation of Delaware
Filed Aug. 17, 1967, Ser. No. 661,436
Claims priority, application Netherlands, Aug. 19, 1966, 6611690
3 Claims. (Cl. 60—24)

ABSTRACT OF THE DISCLOSURE

The invention comprises a hot-gas reciprocating engine having a device for controlling the quantity of air introduced into a combustion chamber of the engine. The device is a variable transmission connected to a blower. The transmission is connected with a crank shaft of the engine and is also operatively responsive to pressure within the engine.

---

The invention relates to a hot-gas reciprocating engine, the output power of which can be varied by varying the average pressure in the working space of the engine, this engine comprising a device for the supply of combustion air to the combustion chamber of the motor and a device for controlling the quantity of combustion air to be supplied in dependence upon the quantity of fuel to the burner of the engine.

It is known to couple a fan for the supply of air to the combustion chamber directly with the shaft of the engine so that the number of revolutions of the ventilator is determined only by the number of revolutions of the engine. The fuel consumption of the engine is, however, proportional to the product of the speed of the engine and the pressure in the working space of the motor. In such a hot-gas reciprocating engine the fuel-air ratio may be very unfavourable in dependence upon the adjustment of the engine. With such a hot-gas reciprocating engine it is furthermore known to control the quantity of air to be supplied to the combustion chamber by means of a choking valve, the position of which is adjusted by means of a hydraulic control-system, which responds to the quantity of fuel supplied to the burner. If the average pressure in the working space of the engine is, for example, reduced, whilst the number of revolutions of the engine remains the same, the speed of the ventilator will remain unchanged. A reduction of the quantity of supplied combustion air will be obtained by reducing the passage of the choke. This reduces the efficiency of the device for the supply of combustion air, so that energy is wasted.

The invention has for its object to provide a hot-gas reciprocating engine, in which the control of the air supply with respect to the quantity of fuel is performed in a reliable and accurate manner, whilst the structure is simple and losses are yet avoided. According to the invention the device for controlling the quantity of combustion air to be supplied to the combustion chamber is formed by members which actuate the air supply device in dependence upon the number of revolutions and the average pressure of the engine. It has been found possible in this way to ensure, without measuring the quantity of fuel, such a supply of combustion air that the fuel-air ratio has the desired value at any adjustment of the engine without losses being involved. It should be considered there is a relationship between the output power and hence the quantity of fuel supply and the average pressure in the working space of the engine and the speed thereof. The product of the pressure and the speed is a measure for the consumed quantity of fuel. The quantity of air supplied by the ventilator is, in accordance with the invention, also proportional to the product of the number of revolutions and the pressure of the engine.

In one embodiment of the invention the device for the supply of combustion air is coupled through a variable transmission with a shaft of the engine, the transmission ratio being adjustable in accordance with the average pressure of the engine. By coupling the variable transmission with the shaft of the engine the device for the supply of the combustion air depends upon the speed of the engine. The adjustment of the variable transmission is performed under the influence of the average pressure of the engine.

In an advantageous embodiment of the invention the variable transmission comprises an input shaft, which is coupled with the shaft of the engine, and an outgoing shaft which is coupled with a ventilator, both the input shaft and the outgoing shaft having each a stationary and a displaceable conical disc, the discs of the two shafts being coupled by a belt or the like, whilst the displaceable conical disc on one of the shafts is subjected to the influence of spring members acting in the direction towards the stationary disc and the displaceable disc on the other shaft is subjected to the influence of spring members and of a plunger acting opposite the spring members and adapted to move in a cylinder, the space of which communicates with a space in which the working pressure of the engine prevails so that the average pressure of the engine prevails in said cylinder.

Referring to the figure, with reference to which the invention will be described more fully, reference numeral 1 designates the cylinder of a hot-gas reciprocating engine, in which a displacer 2 and a piston 3 are adapted to reciprocate with relative phase difference. The piston 3 has two piston rods 4, each of which is connected with a crank 5 of a crank shaft 6. A displacer rod 7, fastened to the displacer piston 2 and taken through the piston, is connected with a crank 34 of the crank shaft 6.

The upper end of the cylinder 1 is formed by a cylinder head 8. The compression space 9 communicates with the expansion space 10 of the engine through a cooler 11, a regenerator 12, a set of heating pipes 13, which lead to a ring channel 14, and a set of pipes 15, which lead from the ring channel to the expansion space 10. The heating pipes surround a combustion chamber in which a burner 16 is arranged, to which oil is supplied. Around the combustion chamber a heat exchanger 17 is arranged, to which combustion air is fed by a ventilator 28 and from which the flue gases are conducted away.

The shaft 6 of the engine has a conical stationary disc 18 and an axially displaceable conical disc 19, which is secured against rotation about the shaft. A sleeve 20 is secured to the disc 19. Between a stop 21 on the shaft 6 and the bottom of the sleeve 20 a spring 22 is provided, which tends to push the discs 18 and 19 away from each other. A cylinder 23 accommodates a movable plunger 24. Through a capillary tube 25 the cylinder communicates with the working space 9 of the hot-gas reciprocating engine so that the pressure in the cylinder 23 is equal to the average pressure of the engine. The force exerted on the plunger 24 by the pressure in the cylinder is transferred via on axial bearing 26 to the displaceable disc 19. A shaft 27 is provided with a ventilator 28 for the supply of combustion air to the combustion chamber of the engine. The shaft 27 has furthermore a stationary conical disc 29 and an axially displaceable, conical disc 30, which is secured against rotation around the shaft 27. Between the disc 30 and a stop 31 on the shaft 27 a spring 32 is provided, which urges the disc 30 towards the disc 29. A belt 33 is arranged between the pairs of discs 18, 19 and 29, 30.

The power and the fuel consumption of a hot-gas reciprocating engine are substantially proportional to the product of the speed and the average working pressure in the engine. In order to supply a quantity of air to the combustion chamber which provides invariably the optimum combustion with the supplied fuel, the air supplied by the ventilator has to be proportional to the product of the speed and the working pressure of the engine. A variation of the speed and of the working pressure then does not affect the fuel-air ratio. In the hot-gas reciprocating engine shown in the figure, the discs 18 and 19 are coupled with the shaft 6, so that the speed of the ventilator depends upon the speed of the shaft 6 of the engine. Moreover, the pressure prevailing in the cylinder 23, which corresponds with the average pressure of the engine, affects the position of the disc 19, so that the transmission ratio of the ventilator is adjusted. If, for example, the average pressure of the engine increases, the disc 19 moves towards the disc 18 until the force exerted on the plunger 24 establishes the state of equilibrium with the tension of the spring 22. The belt 33 is then moved by the conical discs 18 and 19 to a greater distance from the shaft 6. Owing to the tension of the belt 33 the disc 30 moves against the force of the spring 32 towards the stop 31, so that the belt on the discs 29 and 30 approaches the shaft 27. At this new transmission ratio of the change-speed gear the ventilator 28 will thus attain a higher number of revolutions. The speed of the ventilator thus depends not only on the speed but also on the average pressure of the engine. By using the variable transmission shown, coupled with the engine, the quantity of air supplied by the ventilator will thus be proportional to the supplied quantity of fuel for any power, any speed and any average pressure of the engine. The control of the fuel-air ratio is thus enabled in a very efficacious, structurally simple manner. The cylinder 23 need not communicate indirectly with the working space 9 of the engine. The cylinder 23 may communicate with a space which communicates with the working space of the engine, for example, a buffer space.

The control of the ventilator speed in dependence upon the speed and the average pressure of the engine may be performed in a manner differing from that shown in the figure. For example, the ventilator may be driven by an electric motor having a variable speed. The pressure and the speed of the hot-gas reciprocating engine may each be registered by means of a feeler, which emits a signal to an electric control-device. In this control-device the two signals are multiplied and amplified, whilst the speed of the electric motor is controlled by the output signal of said control-device.

What is claimed is:

1. A device for controlling the quantity of combustion air supplied to a hot-gas engine, said hot gas engine being provided with a cylinder and at least one piston defining together an expansion space and compression space comprising; a variable transmission arrangement, means connecting said variable transmission arrangement to a crank shaft of said hot gas engine, and means operatively connecting said variable transmission arrangement to said compression space so that said transmission responds to the average presure prevailing in said compression space, and means operatively connected to said variable transmission arrangement for supplying combustion air to said hot-gas engine.

2. A device as recited in claim 1 wherein said means for supplying combustion air to said hot-gas engine includes a blower fan which is operatively connected to said variable transmission arrangement.

3. A device as claimed in claim 2 wherein said variable transmission arrangement comprises a rotatable input shaft coupled to the shaft of said engine, a rotatable output shaft coupled to said blower for a stationary disc and a displaceable conical disc on both said input and output shafts, belt means on said discs coupling said shafts, a first spring urging one of said displaceable discs in the direction of said stationary disc, a second spring and a piston-cylinder combination urging the other of said displaceable discs in the direction of said stationary disc, said means connecting said variable transmission arrangement to a tube whereby the average pressure of said working space prevails in said cylinder to thereby move said piston in said cylinder responsive to said pressure and additionally move said other displaceable disc to change the transmission ratio between said rotatable input and output shafts.

References Cited

FOREIGN PATENTS 624,970 8/1961 Canada.

MARTIN P. SCHWADRON, *Primary Examiner.*

CARROLL B. DORITY, *Assistant Examiner.*